United States Patent
Kim et al.

(10) Patent No.: US 9,219,656 B2
(45) Date of Patent: Dec. 22, 2015

(54) REMOTE MANAGING SYSTEM AND METHOD

(71) Applicant: LG CNS CO., LTD., Seoul (KR)

(72) Inventors: Gi Jung Kim, Seoul (KR); Jae Young Park, Gyeonggi-do (KR); Ji Seong Song, Seoul (KR)

(73) Assignee: LG CNS CO., LTD., Seoul (KR)

( * ) Notice: Subject to any disclaimer, the term of this patent is extended or adjusted under 35 U.S.C. 154(b) by 269 days.

(21) Appl. No.: 13/849,681

(22) Filed: Mar. 25, 2013

(65) Prior Publication Data

US 2014/0067906 A1     Mar. 6, 2014

(30) Foreign Application Priority Data

Sep. 4, 2012 (KR) .................. 10-2012-0097940

(51) Int. Cl.
```
G06F 15/173      (2006.01)
H04L 12/24       (2006.01)
H04L 29/08       (2006.01)
```
(52) U.S. Cl.
CPC .............. *H04L 41/50* (2013.01); *H04L 41/046* (2013.01); *H04L 41/08* (2013.01); *H04L 67/125* (2013.01)

(58) Field of Classification Search
CPC .............. G06F 8/60; G06F 15/177; H04L 41/08–41/0893; H04L 41/04–41/065
USPC ................. 709/202, 223, 224, 35
See application file for complete search history.

(56) References Cited

U.S. PATENT DOCUMENTS

| | | | |
|---|---|---|---|
| 2002/0069259 A1* | 6/2002 | Kushwaha et al. | 709/217 |
| 2004/0085947 A1* | 5/2004 | Ekberg et al. | 370/349 |
| 2005/0086340 A1* | 4/2005 | Kang et al. | 709/224 |
| 2006/0015512 A1* | 1/2006 | Alon et al. | 707/100 |
| 2006/0215684 A1* | 9/2006 | Capone | 370/437 |
| 2007/0156706 A1* | 7/2007 | Hayes | 707/10 |
| 2012/0233299 A1* | 9/2012 | Attanasio et al. | 709/220 |
| 2012/0296959 A1* | 11/2012 | Momchilov et al. | 709/203 |

FOREIGN PATENT DOCUMENTS

| | | |
|---|---|---|
| JP | 2010503918 A | 2/2010 |
| KR | 1020070092198 | 9/2007 |

* cited by examiner

*Primary Examiner* — Brendan Higa
(74) *Attorney, Agent, or Firm* — Maxine L. Barasch; Keohane & D'Alessandro, PLLC

(57) ABSTRACT

Provided are approaches for remote managing comprising at least one or more agents being resident in at least one or more management terminals connected to each other through a network and controlling the corresponding management terminals; and a management server transmitting to the agents a request for a service for managing the management terminals, where the management server transmits the request to the agent through a control channel. An independent control channel is formed between a management server and a management device separately from an ordinary communication channel and, in case the management device is required to perform a server role for a particular service, makes the corresponding management device require a request related to the service through a control channel and thus, the server role is assigned to the management server at the time of carrying out a service.

19 Claims, 8 Drawing Sheets

REMOTE MANAGING SYSTEM AND METHOD

CROSS-REFERENCE TO RELATED APPLICATION

This application claims priority under 35 U.S.C. §119 to Korean Patent Application No. 10-2012-0097940, filed on Sep. 4, 2012, in the Korean Intellectual Property Office, the contents of which is incorporated herein by reference.

BACKGROUND OF THE INVENTION

1. Field of the Invention

The present invention relates to a remote managing technology and more particularly, a remote managing system and method for the system which, at the time a service is provided in a network formed between a management server and a management device, assigns a server role to the management server.

2. Discussion of the Related Art

As computing technologies advance, a wide variety of applications are now adopting a remote management-based system. For example, various kinds of terminals used in workplaces are equipped with an agent program for the control thereof; a management server, being coupled with such an agent program, controls individual terminals.

However, a management server of such kind is required to change its system configuration to accommodate a network structure since installation positions of terminals equipped with an agent program on the network or installation conditions imposed are different from each other. In other words, it is a common observation that for most system environments, a management server is connected to a network, commonly through a firewall, and a terminal employing an agent program can be used for various kinds of network environments; thus, due to the constraints on network configuration, additional costs for dedicated management or processing such as a firewall, router, and the like are required in the middle of a routing path to ensure bilateral connectivity. Moreover, according to such a network configuration, to accommodate a configuration set-up for various kinds of firewalls installed at agent-side terminals, services provided by a management server (for example, remote procedure call (RPC) service) are required to carry out configuration for RPC service, and continuous management of the services is required to cope with a network change.

To deal with this situation, standard specifications have been developed, where SOAP (Simple Object Access Protocol) is one of such communication standards. SOAP RPC is heavily used for service-to-service communication, carrying out data linkage at a predetermined time by a real-time or batch process, for example. Unless SOAP is used for bilateral data exchange, a server's role is almost fixed and accordingly, the server's role in a network is not changed, thus making communication performed easily. However, if the role of a server is changed as in the case where the server requests control of the operation of a terminal, the server has to issue a request to the terminal and therefore, the server has to perform the role of a client in the network; examples of communication protocol for such a case include FTP (File Transfer Protocol), SIP (Session Initiation Protocol), and so on. In this case, one may confront a connection problem due to the inherent network structure.

In addition, although separate standards or specifications exist dealing with such a case, they cannot be applied the same for all kinds of routers and their application is impossible for those environments where out-bound connections are limited as being located beneath a firewall.

SUMMARY OF THE INVENTION

The present invention has been made in an effort to provide a remote managing system and a method for the system which establishes an independent control channel between a management server and a management device and, if the management device is required to operate as a server for a predetermined service, assign a server role to a management server by allowing the corresponding management device to make a service-related request through a control channel. As a result, this provides services reliably and independently of configuration and characteristics of a network formed between the management server and the management device.

Also, the present invention provides a remote managing system and a method for the system which establish an independent control channel between a management server and a management device separately from ordinary communication channels and continuously check the reliability of the control channel, thereby providing a management service more reliably.

In one embodiment, the invention includes a system for remote managing, comprising: at least one or more agents being resident in at least one or more management terminals connected to each other through a network for controlling the corresponding management terminals; and a management server transmitting to the agents a request for a service for managing the management terminals, wherein the management server transmits the request to the at least one or more agents through a control channel.

In another embodiment, the invention provides a method for remote management of a management server, the method comprising: forming and maintaining a control channel for an agent controlling a management terminal between a management server and the agent; transmitting to the agent by the management server, a request for a service for managing the management terminal; and requesting the request by the agent from the management server in response to the request for the service for managing the management terminal.

In yet another embodiment, the invention provides a method for remote managing for controlling a management terminal, the method comprising: forming and maintaining a control channel in conjunction with a management server; and if a service name is received from the management server through the control channel, selecting a request related to the received service name, and providing the service name to the management server.

In yet another embodiment, the invention provides a non-transitory computer-readable storage medium storing computer instructions, which when executed, enables a computer system to carry out a method for remote managing, the computer instructions comprising: forming and maintaining a control channel for an agent managing a management terminal between a management server and the agent; transmitting a request for a service for managing the management terminal from the agent by the management server; and requesting the request from the management server in response to the request by the agent.

In yet another embodiment, the invention provides a storage medium storing a program for carrying out a method for remote managing, the program comprising instructions for: forming and maintaining a control channel in conjunction with a management server; and selecting a request related to a received service name if the service name is received through the control channel from the management server and providing the service name to the management server.

BRIEF DESCRIPTION OF THE DRAWINGS

The accompanying drawings, which are included to provide a further understanding of this document and constitute a part of this specification, illustrate embodiments of this document and together with the description serve to explain the principles of this document.

Figure 1:
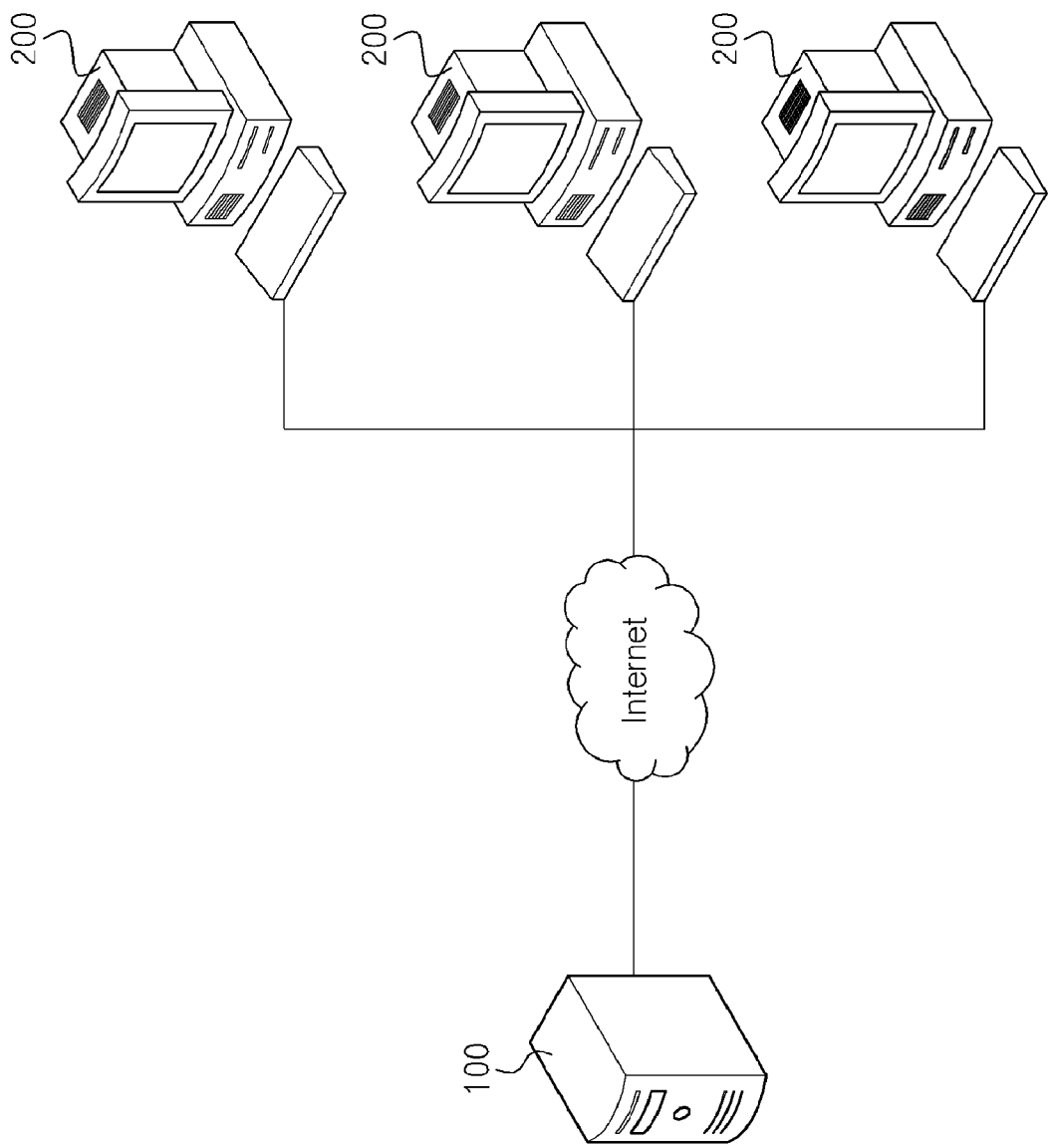
FIG. 1 is a block diagram illustrating a system for remote managing according to the present invention.

The drawings are not necessarily to scale. The drawings are merely schematic representations, not intended to portray every specific parameter of the invention. The drawings are intended to depict only typical embodiments of the invention, and therefore should not be considered as limiting the scope of the invention. In the drawings, like numbering represents like elements.

DETAILED DESCRIPTION OF THE INVENTION

This document provides exemplary embodiments of the present invention for the purpose of providing structural or functional descriptions of the present invention. Therefore, it should be understood that the technical scope defined by the appended claims of the present invention is not limited to the embodiments introduced in this document. In other words, since embodiments can be modified in various ways and take various forms of implementation, it should be understood that the technical scope defined by the claims of the present invention include whichever equivalent realizing the technical principles of the present invention.

Meanwhile, terms introduced in this document should be understood as follows.

Terms such as first, second, and so on are intended for identifying one component from another but the technical scope should not be limited by the terms. For example, a first component may be called a second component and vice versa.

If a component is said to be "connected" to a different component, the component may be directly connected to the different component but a third component may exist to connect the two components even though the two components may be connected directly. On the other hand, if a component is said to be "connected directly" to another component, it should be interpreted that there is no further component between the two components. Similarly, other expressions describing relationships between components such as "between" and "just between" or "next to" and "immediately next to" and the like should also be understood in the same way as above.

Singular expression should be interpreted to include plural expressions unless otherwise stated explicitly. Terms such as "include" or "have" are meant to signify existence of embodied characteristics, numbers, steps, behavior, components, modules, and combinations thereof, which should be understood that possibility of existence or addition of one or more characteristics, numbers, steps, behavior, components, modules, and combinations thereof are not precluded beforehand.

Identifying symbols for individual steps (for example, a, b, c, and so on) are used for the purpose of convenience of description and do not intend to represent the order of the steps; unless a particular order is specified, individual steps can be carried out in an order different from that used in this document. In other words, individual steps can be carried out in the same order as described in the document, virtually at the same time, or in the opposite order.

This disclosure may be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "computing," "determining," "evaluating," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

The present invention can be implemented in a non-transitory computer-readable storage medium in the form of computer-readable program codes. Computer-readable recording media include all types of recording apparatus in which computer-readable data are stored. Examples of a computer-readable storage medium are ROM, RAM, CD-ROM, magnetic tape, floppy tape, optical data storage device, and so on. Implementation in the form of carrier waves (for example, transmission through the Internet) can also be regarded as an example of computer-readable storage medium. Computer-readable recording media can be distributed across computer systems connected to each other through a network and computer-readable program codes can be stored and executed in a distributed manner.

Unless otherwise defined, all the terms used in this document possess the same meaning as understood by those skilled in the art to which the present invention belongs. The terms such as those defined in a dictionary for general use should be interpreted to carry the same contextual meaning in the related technology and they should not be interpreted to possess an ideal or excessively formal meaning.

FIG. 1 is a block diagram illustrating a system for remote managing according to the present invention.

With reference to FIG. 1, a system for remote managing comprises at least one or more management terminals 200 and a management server 100. Here, at least one or more management terminals 200 and a management server 100 may belong to different environments from each other. This is intended to demonstrate, among other things, that the present invention could be implemented within a network environment (e.g., the Internet, a wide area network (WAN), a local area network (LAN), a virtual private network (VPN), etc.), a cloud-computing environment, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, the computer infrastructure is intended to demonstrate that some or all of the components of implementation could be deployed, managed, serviced, etc., by a service provider who offers to implement, deploy, and/or perform the functions of the present invention for others.

In exemplary embodiments, a system for remote managing can manage the management terminal 200 by using an agent. In other words, an agent, being resident in at least one or more management terminals 200, can control the corresponding management terminal 200.

A management server 100 manages management terminals 200 in conjunction with each of at least one or more agents resident in at least one or more management terminals 200. According to whether an agent carries out a server role for a particular service, the management server 100 controls the corresponding agent to make a request by using a separate communication line (i.e, a control channel further described below). In other words, even though it may be the case that an agent performs a server role for a particular service, to ensure that the agent carries out a formal procedure as a client, the management server 100 requests the corresponding agent to transmit a request to the management server 100. At this time, in addition to the role above, in case a conventional operation is carried out between the management server 100 and an agent, an ordinary channel is used for the operation between the management server 100 and the agent.

Such kind of management server 100 and agent will be described in more detail with reference to FIGS. 3 to 6 below.

Figure 2:
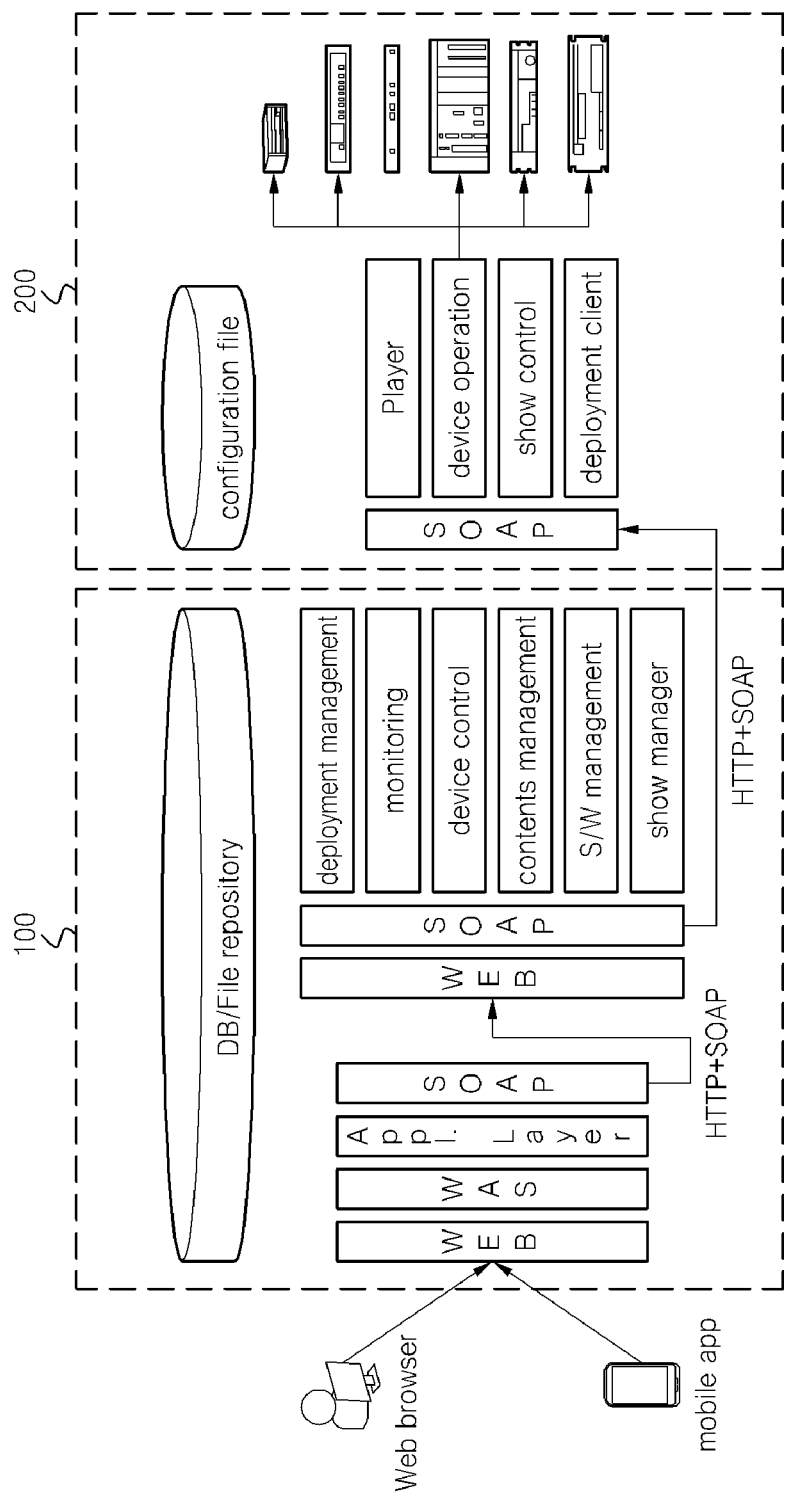
FIG. 2 illustrates one specific example of a system for remote management of FIG. 1.

FIG. 2 illustrates one specific example of a system for remote management of the system of FIG. 1.

As shown in FIG. 2, a management server 100 can communicate with constituting elements within the management server 100 or an agent of a management terminal 200 based on HTTP and SOAP (Simple Object Access Protocol). As used herein, for the purpose of description, SOAP protocol is assumed to be used, but it will be appreciated that the technical scope of the present invention is not limited to a particular protocol.

Figure 3:
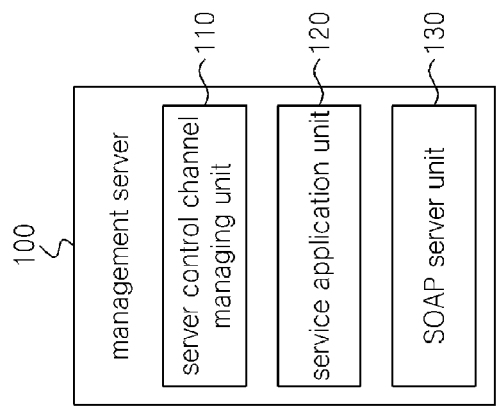
FIG. 3 is a block diagram illustrating one embodiment of a management server according to the present invention.

FIG. 3 is a block diagram illustrating one embodiment of a management server according to the present invention.

The management server 100, if an agent-related service is requested, checks whether an agent assumes a server role carrying out a predetermined process for the corresponding service. If it turns out that the server role is assigned to the agent, the management server 100 requests the agent to transmit a service request to the management server 100, thereby carrying out the service.

In one embodiment, the management server 100, if receiving a request transmitted by the agent upon request of the management server 100, provides information about a predetermined process to be carried out by the agent to carry out the corresponding service, along with data accompanying the information, in response to the request.

With further reference to FIG. 3, the management server 100 includes a server control channel managing unit 110 and a service application unit 120. In one embodiment, the management server 100 can further include a SOAP server unit 130.

The server control channel managing unit 110 can form a control channel for each agent in conjunction with the agent. For example, the server control channel managing unit 110 can form a TCP channel in conjunction with an agent.

In one embodiment, the server control channel managing unit 110 can identify an agent. Specifically, the server control channel managing unit 110 identifies an agent by using an agent ID included in a bootup message transmitted by the corresponding agent.

In one embodiment, the server control channel managing unit 110 can monitor the connection status of an agent. That is, the server control channel managing unit 110, by using a bootup message transmitted by an agent, monitors an operating status of the corresponding agent in normal conditions. For example, if a period is 30 seconds and a normal bootup message is not received from the corresponding agent within predetermined number of periods, the server control channel managing unit 110 decides that a failure has occurred.

In one embodiment, the server control channel managing unit 110 provides the respective agents with a service-related request or message requested by the service application unit 120. Specifically, the server control channel managing unit 110, receiving a request for carrying out a particular service for an agent from the service application unit 120, identifies the corresponding agent and transmits to the corresponding agent a message with the name of a requested service inserted therein.

The service application unit 120 is configured to carry out a service-related request for an agent. In one embodiment, the service application unit 120, by providing a service name to an agent through a control channel, can request the agent to transmit thereto a request related to the corresponding service. For example, the service application unit 120 can provide the server control channel managing unit 110 with an agent identifier and a service name. The server control channel managing unit 110 determines a control channel to be used based on the agent identifier, and transmits a service name to the determined control channel.

The SOAP server unit 130, in response to a request by the management server 100 for a service corresponding to a client role, can generate parameters required for processing a response message. For example, the SOAP server unit 130, in case handling of a service requested to a SOAP client 230 is required to be processed by the SOAP client 230 rather than the SOAP server unit 130, generates data required for processing the corresponding service in the form of parameters contained in a response message and thus makes a response.

Figure 4:
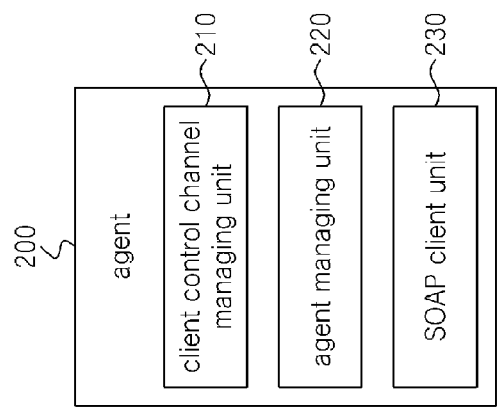
FIG. 4 is a block diagram illustrating one embodiment of an agent according to the present invention.

FIG. 4 is a block diagram illustrating one embodiment of an agent according to the present invention.

As shown in FIG. 4, the agent 200 includes a client control channel managing unit 210 and an agent managing unit 220. In one embodiment, the management server 100 further comprises a SOAP client unit 230.

During operation, the client control channel managing unit 210 obtains a TCP (Transmission Control Protocol) in conjunction with a management server, and restores the corresponding TCP channel in case the TCP channel is lost.

In one embodiment, the client channel managing unit 210 can maintain a TCP channel. For example, the client control channel managing unit 210 obtains a TCP channel by connecting to a server control channel managing unit 110 at the time of initial operation and makes the management server 100 to identify the corresponding agent by transmitting a bootup message.

In one embodiment, the client control channel managing unit 210 transmits a bootup message periodically. For example, the client control channel managing unit 210 transmits a bootup message every 30 seconds, thereby checking the status of the corresponding agent.

In another embodiment, the client control channel managing unit 210 restores a lost TCP channel. For example, in case a TCP channel is lost due to a unexpected reason, the client control channel managing unit 210 obtains the TCP channel again by attempting connection to the server control channel managing unit 110.

In yet another embodiment, the client control channel managing unit 210 carries out a re-connection trial, e.g., every 10 seconds to prevent an overload due to a continuous trial of connection to the management server 100.

In still yet another embodiment, the client control channel managing unit 210 transmits a service request message. For example, the client control channel managing unit 210 transmits a service name received from the server control channel managing unit 110 to the SOAP client unit 230 or agent managing unit 220.

The agent managing unit 220, if a service name is received from the management server 100 through the client control channel managing unit 210, selects a received service name and a related request and provides them to the management server. Due to the processing above, an agent is made to perform a client role from a formal point of view, even when it actually performs a server role for a particular service. Therefore, services can be provided independently in spite of the difference in network configuration between the management server 100 and the management terminal 200.

In one embodiment, the agent managing unit 220 manages a predetermined communication channel through which a request is made independently of a control channel receiving a service name.

In another embodiment, the agent managing unit 220 makes a service request from the management server 100 by including an agent identifier of its own in addition to a service name-related request.

The SOAP client unit 230 carries out a service-related function about a message including parameters among response messages. For example, the SOAP client unit 230, in case a response received from the SOAP server unit 120 contains parameters, analyzes response parameters of the corresponding service, thereby carrying out an internal service call.

In one embodiment, the SOAP client unit 230 processes commands related to carrying out a service request from an external process. For example, the SOAP client unit 230 requests the corresponding service from the SOAP server unit 130 by using a service name received from the client control channel managing unit 210 or agent managing unit 220.

Figure 5:
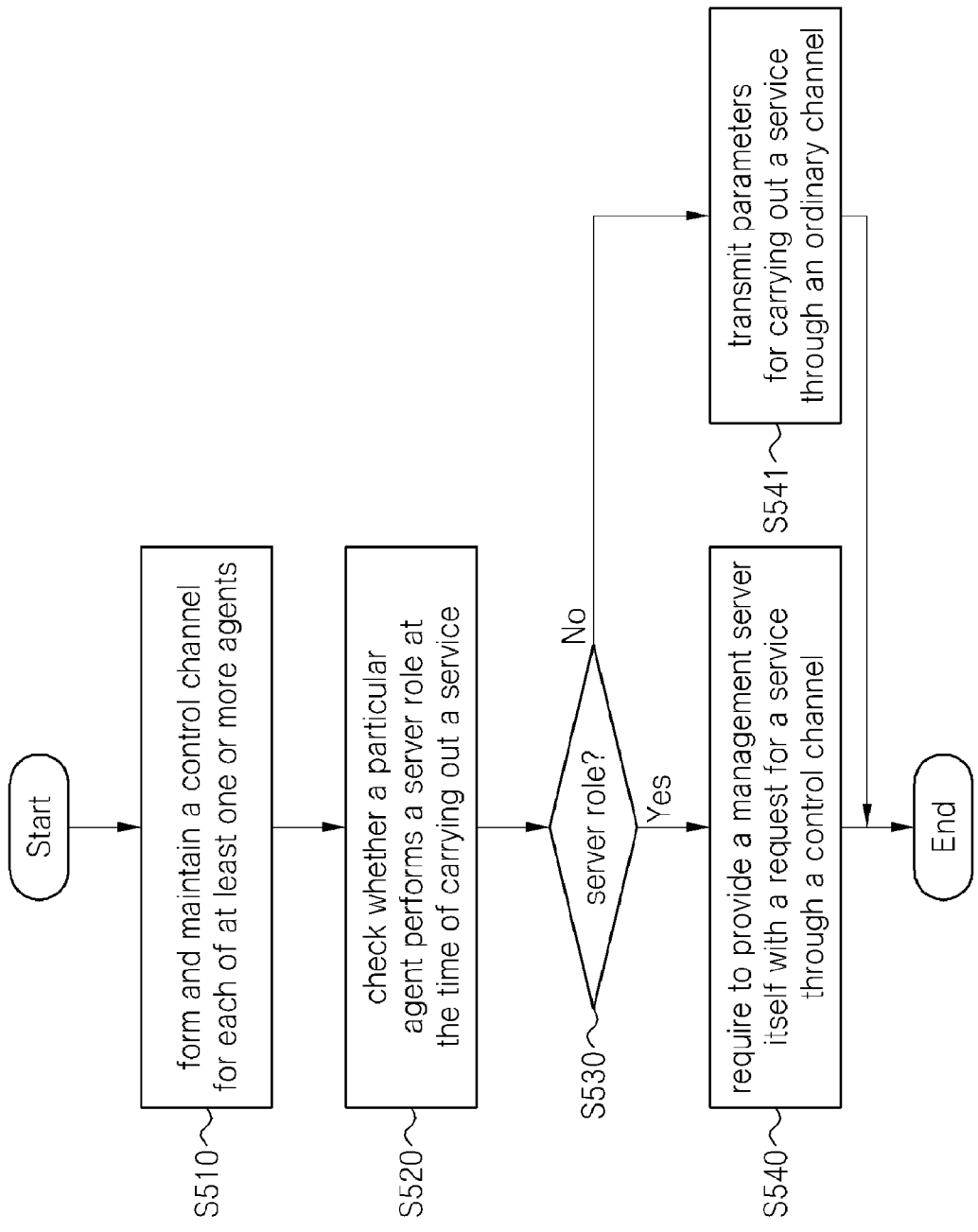
FIG. 5 is a flow diagram illustrating one embodiment of a method for remote managing according to the present invention.

FIG. 5 is a flow diagram illustrating one embodiment of a method for remote managing according to the present invention. In this embodiment, the method for remote managing shown in FIG. 5 relates to a method for remote managing carried out in the management server 100.

As shown in FIG. 5, the management server 100 generates and maintains a control channel for each of at least one or more agents S510. On the other hand, the management server 100 employs an ordinary channel when it carries out conventional roles related to an agent.

In case an agent-related service is required, to carry out the corresponding service, the management server 100 checks whether an agent performs a server role, which carries out a predetermined process for the corresponding service S520.

If it is found from the checking that the agent performs a server role S530, the management server 100 requests the agent to transmit a request for a service to the management server itself 100 through a control channel S540.

In one embodiment of S510, the management server 100 identifies a control channel for at least one or more agents by using an agent identifier of a bootup message provided by at least one or more agent, and decides an occurrence of a failure in the corresponding control channel if a bootup message is not received within a predetermined period.

In one embodiment of S520, the management server 100 determines whether at least part of the computational process required for carrying out a service is required to be carried out at an agent and, in that case, decides that a server role is assigned to the agent.

In one embodiment related to S530 and S540, the management server 100 determines a control channel based on an identifier about an agent, and generates an agent request message including a service name about a service in question and provides the agent request message to the agent.

In another embodiment related to S530 and S540, the management server 100, if receiving a request transmitted from an agent, provides information about a predetermined process to be carried out by the agent to perform corresponding service, as well as data accompanying the information, as a response to the request.

Figure 6:
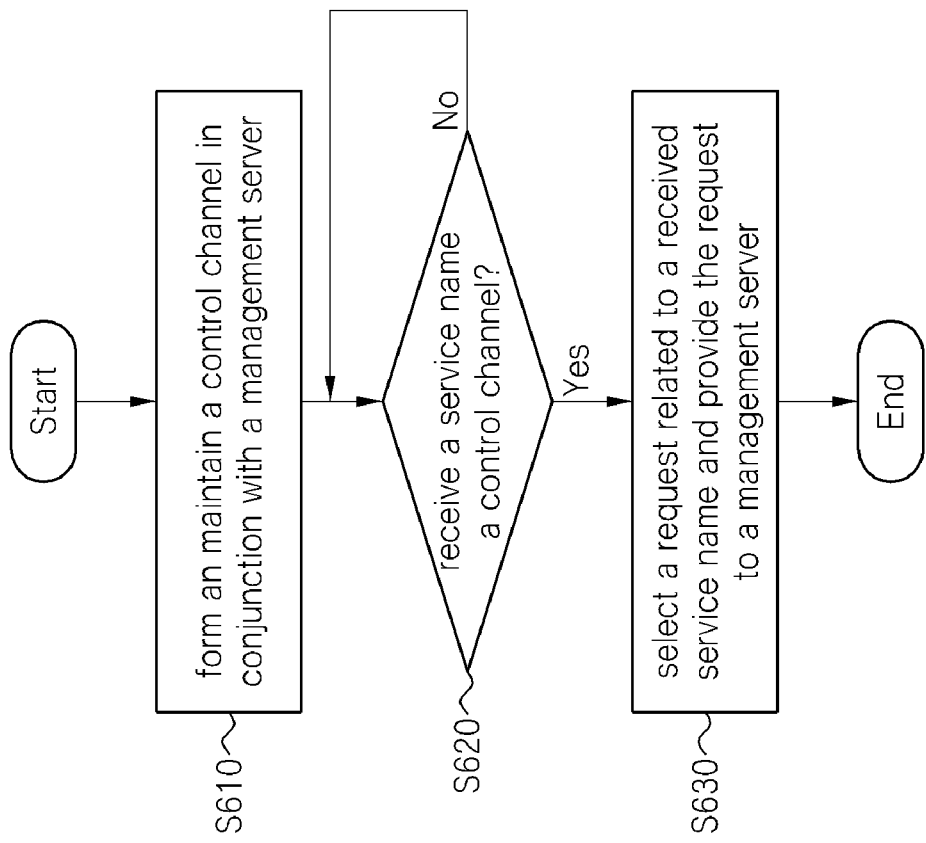
FIG. 6 is a flow diagram illustrating another embodiment of a method for remote managing according to the present invention.

FIG. 6 is a flow diagram illustrating another embodiment of a method for remote managing according to the present invention. FIG. 6 represents another embodiment of the method for remote managing shown in FIG. 5, which relates to a method for remote managing carried out in an agent.

As shown in FIG. 6, an agent can generate and maintain a control channel in conjunction with the management server 100 (S610). On the other hand, in case a conventional operation is carried out between the management server 100 and an agent, an ordinary channel is used for the operation between the management server 100 and the agent.

If a service name is received from the management server 100 through a control channel S620, an agent selects a request related to the received service name and provides the selected request to the management server 100 (S630).

In one embodiment of S610, the agent connects to the management server 100 and obtains a TCP (Transmission Control Protocol) channel and configures the TCP channel as a control channel, and provides a bootup message to the management server 100 through the TCP channel at predetermined unit intervals.

Figure 7:
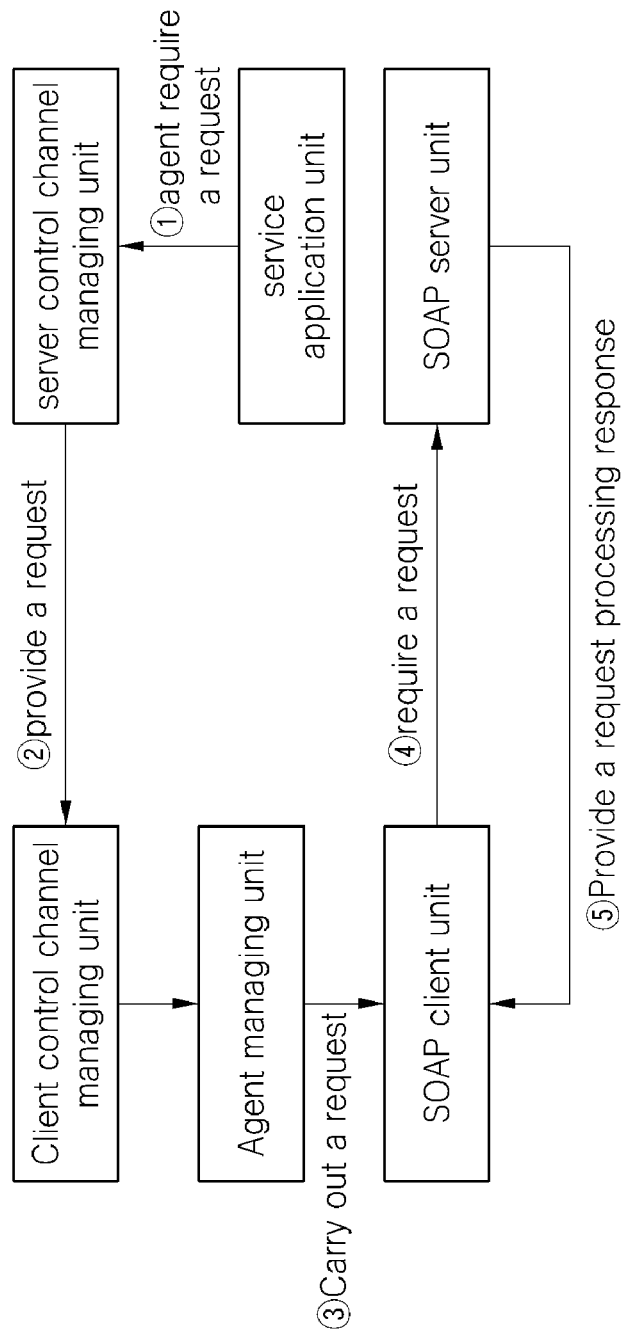
FIG. 7 is a block diagram illustrating a process flow of a SOAP RPC service call carried out between individual components of a management server and an agent.

FIG. 7 is a block diagram illustrating a process flow of a SOAP RPC service call carried out between individual components of a management server and an agent.

As shown in FIG. 7, to deal with a network connection problem found in the prior art and invention, the management server 100 according to the present invention provides a service name of a request to an agent and makes the agent require a request from the server.

To be more specific, the service application unit 120 of the management server 100, if needed to provide a certain order or command to an agent, provides the corresponding service name and ID of the agent to the server control channel managing unit 110.

The server control channel managing unit 110, by using the service name and the agent ID provided, identifies a client of the corresponding agent among channels and provides the service name to a TCP channel of the corresponding agent.

The client control channel managing unit 210 of the agent provides the provided service to the agent managing unit 220 or SOAP client unit 230. If the agent managing unit 220 received the provided service, the agent managing unit 220 can provide the corresponding service to the SOAP client unit 230.

The SOAP client unit 230 identifies the provided service name and requires the corresponding request. The SOAP server unit 130 processes the provided request and responds by making a response message including the processing result.

As shown in FIG. 7, the management server 100 of the present invention always carries out a server role in a network. However, depending on the needs, that is, in case the management server 100 requires some request from the agent or carries out some request, the management server 100 provides the corresponding service name to a separate control channel instead of requiring a SOAP RPC request from the corresponding agent and thus, makes the agent require the corresponding request from the SOAP server.

Figure 8:
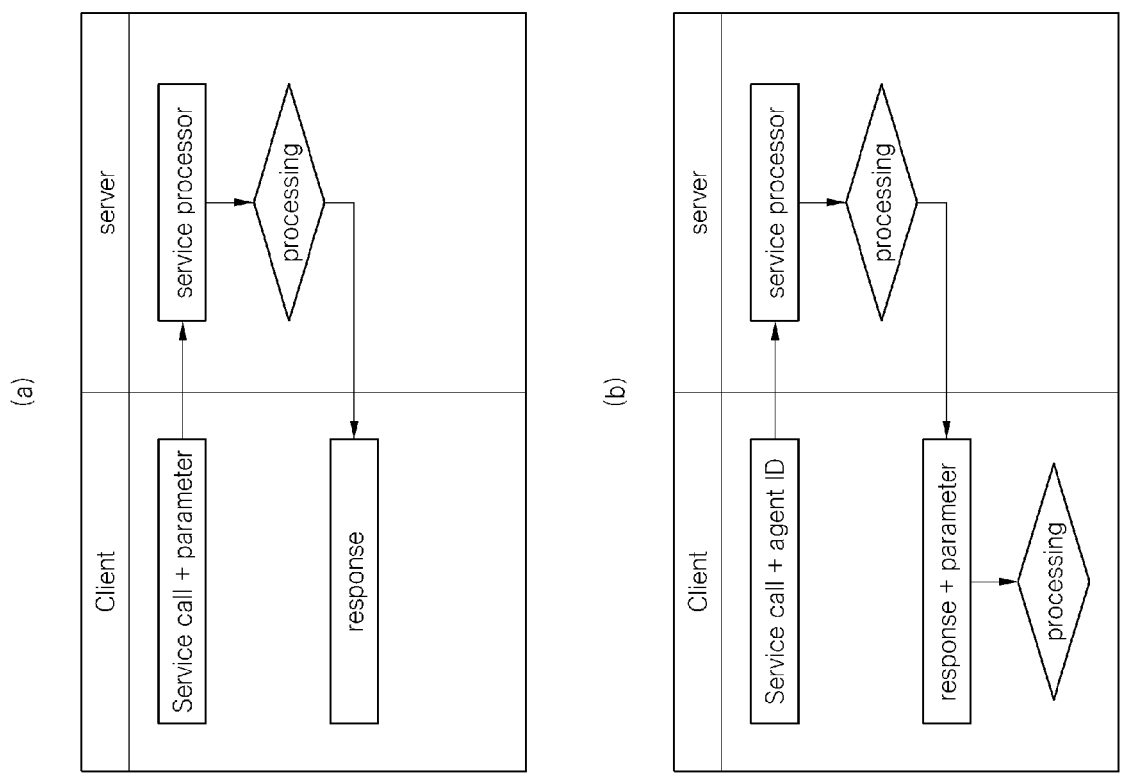
FIGS. 8a-8b illustrate a conventional SOAP RPC message handling method and a SOAP RPC message handling method according to the present invention.

FIG. 8 illustrates a conventional SOAP RPC message handling method and a SOAP RPC message handling method according to the present invention.

As shown in FIG. 8(*a*), the SOAP RPC client (agent) provides the corresponding service with data as parameters at the time of requiring a request and the SOAP RPC server (management server) processes the provided data and reflects the data to the SOAP RPC server. However, such kind of structure is effective only for the case where an ordinary server role is maintained mutually, but may cause a problem in case some constraint is imposed on a connection due to inherent network structure.

Therefore, as shown in FIG. 8(*b*), the present invention allows only the management server 100 to assume a conventional server role. In other words, a request is requested to the management server 100 by using a service name received through a control channel and an agent ID is provided as a parameter. The management server checks the provided agent ID and generates data needed for the corresponding agent to perform the corresponding service in the form of parameters of a response message, and provides the response message to the agent. The agent checks parameters of a provided response message and processes tasks to be done by the corresponding service by using the provided data.

Figure 9:
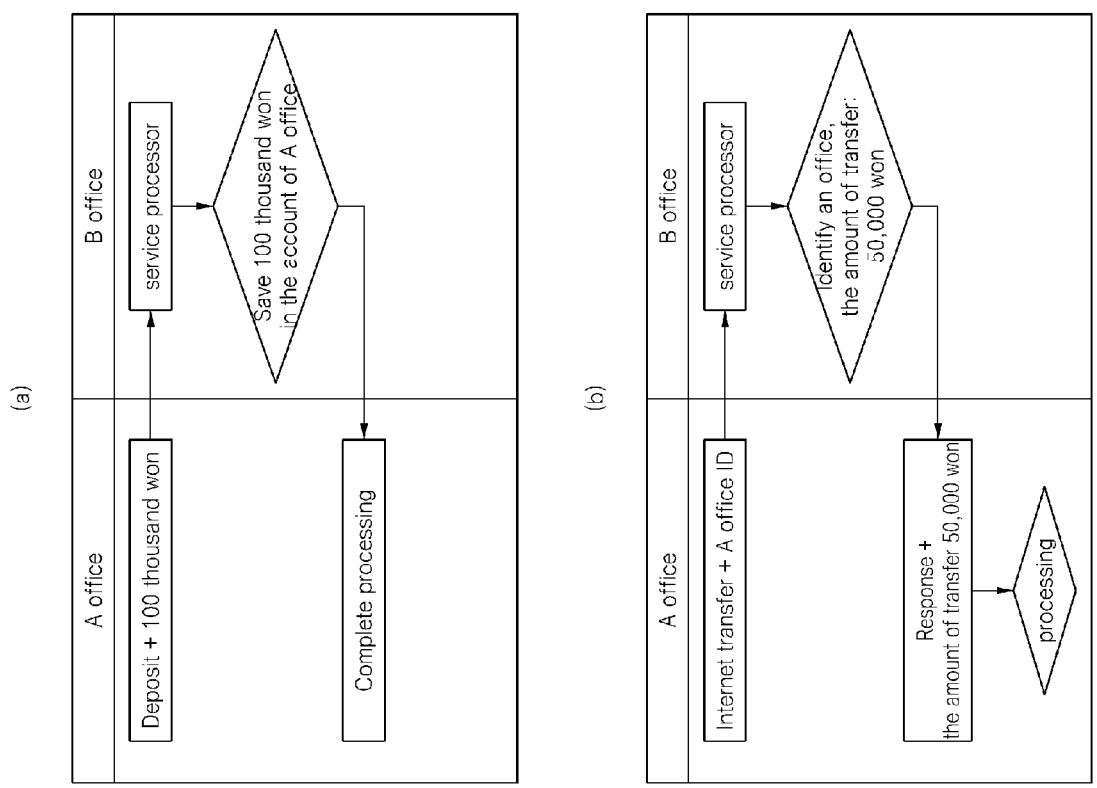
FIGS. 9a-9b illustrate one example of a conventional SOAP RPC message handling method and an example of using a SOAP RPC message handling method according to the present invention.

FIG. 9 illustrates one example of a conventional SOAP RPC message handling method and an example of using a SOAP RPC message handling method according to the present invention. For the purpose of description, it is assumed that A and B correspond to a branch office (management terminal) and a main office (management server), respectively.

FIG. 9(*a*) is an example of a service call, where a client visiting the A office deposits one-hundred thousand (100,000) Korean won and details of the bank account at the A office are provided to the main office, thereby making the corresponding data synchronized. Since there are no limitations on the data transmission through a network from the A to B office, the flow as shown in the figure can be carried out in a normal manner.

In case the client at the A office attempts a bank transfer through the Internet banking, the bank account of the A office at the main office is reduced normally by the corresponding amount of bank transfer. Since a difference by the amount of bank transfer is now generated between the A and B office, the B office requests an order from the A office, requiring adjustment of the account by the amount of bank transfer to accommodate the difference. Here, if there is a problem in a network between the A and B office, the conventional configuration fails to provide the account reduction request from the B office to the A office.

As shown in FIG. 9(*b*), the A office receives a call from the B office and receives a service request due to the Internet transfer carried out at the A office and provides the ID of the A office as a parameter in response to the service call of Internet transfer. The B office finds the details of the Internet banking of the A office and responds by generating a response message by including the amount of the corresponding bank transfer as a parameter. It can be known that the A office reduces the bank account by five-hundred thousand (500,000) won after checking the received response message, thereby synchronizing the account between the main and branch office.

It will be appreciated that embodiments described herein have at least the following advantages. For example, in the prior art, a management server makes a request from an agent for managing a management terminal whereas the present invention the agent makes a request from the management server through a control channel. Therefore, at the time of carrying out a service, the server role is assigned to a management server, thereby providing services reliably independently of configuration and characteristics of a network formed between a management server and a management device.

In addition, according to the present invention, since an independent control channel is formed between a management server and a management device separately from an ordinary communication channel and reliability of the control channel is checked continuously, a management service can be carried out more reliably.

Furthermore, it will be appreciated that the flowcharts described and shown herein illustrate the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Many of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network.

Furthermore, as will be described herein, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

For example, an implementation of exemplary computer systems (e.g., FIGS. 1-3) may be stored on or transmitted across some form of computer readable media. Computer readable media can be any available media that can be accessed by a computer. By way of example, and not limitation, computer readable media may comprise non-transitory "computer storage media" and "communications media."

"Computer-readable storage device" includes volatile and non-volatile, removable and non-removable computer storable media implemented in any method or technology for storage of information such as computer readable instructions, data structures, program modules, or other data. Computer storage device includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although this document provides descriptions of preferred embodiments of the present invention, it would be understood by those skilled in the art that the present invention can be modified or changed in various ways without departing from the technical principles and scope defined by the appended claims.

What is claimed is:

1. A system for remote managing, comprising:
at least one or more agents being resident in at least one or more management terminals connected to each other through a network for controlling the corresponding management terminals;
a management server transmitting, if the particular agent is to perform a server role, to the agents a request for a service for managing the management terminals, wherein the management server transmits the request to the at least one or more agents through a control channel, wherein the control channel is a Transmission Control Protocol (TCP) channel; and
the management server transmitting, if the particular agent is not to perform the server role, parameters for carrying out the service through an ordinary channel, the ordinary channel being a channel other than the control channel.

2. The system for remote management of claim 1, wherein the at least one or more agents identify the request in response to the request for the service for managing the management terminal and requests the request.

3. The system for remote management of claim 1, wherein the management server includes at least one or more control channels for remote control of the agents, and provides a service name of the request for the service through the control channel to make the request requested on the management server.

4. The system for remote management of claim 3, wherein the management server is configured to:
   generate or maintain at least one or more control channels for each of the at least one or more agents; and
   provide, through a control channel, a service name of the corresponding service, and an identifier for an agent intended for carrying out the corresponding service,
   check the agent intended for carrying out the corresponding service by using the agent identifier.

5. The system for remote management of claim 4, wherein, the management server, receiving a request transmitted from the agent according to the request, provides information about a predetermined process to be carried out by the agent intended for carrying out the service and data accompanying the information in response to the request.

6. The system for remote management of claim 4, wherein the server control channel managing unit monitors operating conditions of each of the at least one or more agents based on the receive status of a bootup message provided from each of the one or more agents, and checks the one or more agents by using an agent identifier included in the bootup message.

7. The system for remote management of claim 1, wherein, the agent comprises:
   a client control channel managing unit configured to obtain the TCP channel in conjunction with the management server, and restore the TCP channel if the corresponding TCP channel is lost; and
   an agent managing unit configured to, if a service name is received from the management server through the client control channel managing unit, select a request related to the received service name, and provide the request to the management server.

8. The system for remote management of claim 7, wherein the agent managing unit manages a control channel receiving the service name and a predetermined communication channel requesting the request independently from each other.

9. The system for remote management of claim 7, wherein the agent managing unit requests a request for the service from the management server by adding an agent identifier of its own to the request related to the service name.

10. A method for remote management of a management server, the method comprising:
    forming and maintaining a control channel for an agent controlling a management terminal between a management server and the agent;
    determine whether a particular agent performs a server role at a time for carrying out a service;
    if the particular agent is determined to perform the server role, then transmitting to the agent, through a control channel, by the management server, a request for the service for managing the management terminal; and providing the request by the agent from the management server in response to the request for the service for managing the management terminal, wherein the control channel is a TCP channel; and
    if the particular agent is not determined to perform the server role, then transmitting parameters for carrying out the service through an ordinary channel, the ordinary channel being a channel other than the control channel.

11. The method of claim 10, wherein the agent identifies the request.

12. The method of claim 11, wherein the identifying a request comprises:
    identifying a control channel for the agent by using an agent identifier of a bootup message provided by the agent; and
    deciding an occurrence of a failure in the control channel if the bootup message is not received within a predetermined period.

13. The method of claim 10, wherein the transmitting the request comprises:
    determining whether at least part of a computing process required for carrying out the service is required to be carried out in the agent; and
    in the case that at least part of the computing process required for carrying out the service is required to be carried out in the agent, determining that the agent is supposed to carry out the server role.

14. The method of claim 13, wherein the requesting a request comprises:
    determining a control channel based on an identifier of the agent; and
    generating an agent request message including a service name for the service, and providing the agent request message to the agent by using the control channel.

15. The method of claim 14, wherein the requesting a request further comprises, if receiving the request from the agent, providing information about a predetermined process to be carried out by the agent to carry out the service, and data accompanying the information in response to the request.

16. A method for remote managing for controlling a management terminal, the method comprising:
    forming and maintaining a control channel in conjunction with a management server, the control channel being a Transmission Control Protocol (TCP) channel;
    determining whether an agent is to perform a server role;
    when the determination is that the management terminal is to perform a server role, receiving a service name from the management server through the control channel, selecting a request related to the received service name, and providing the selected request to the management server;
    when the determination is that the management terminal is not to perform a server role, transmit parameters through an ordinary channel, the ordinary channel being a channel other than the control channel.

17. The method of claim 16, wherein the forming and maintaining the control channel comprises:
    obtaining the TCP by connecting to the management server and setting up the TCP channel as the control channel; and
    transmitting a bootup message to the management server through the TCP channel at predetermined unit intervals.

18. A non-transitory computer-readable storage medium storing computer instructions, which when executed, enables a computer system to carry out a method for remote managing, the computer instructions comprising:
    forming and maintaining a control channel for an agent managing a management terminal between a management server and the agent, the control channel being a transmission control protocol (TCP) channel;

in response to a determination that an agent is to perform a server role, transmitting a request for a service for managing the management terminal from the agent by the management server; and requesting the request from the management server in response to the request by the agent.

19. A computer readable hardware storage device storing a program for carrying out a method for remote managing, the program comprising instructions for:

forming and maintaining a control channel in conjunction with a management server, the control channel being a transmission control protocol (TCP) channel;

determining whether an agent is to perform a server role;

when the determination is that an agent is to perform a server role and that the service name is received through the control channel from the management server, selecting a request related to a received service name and providing the service name to the management server; and when the determination is that the management terminal is not to perform a server role, transmit parameters though an ordinary channel, the ordinary channel being a channel other than the control channel.

* * * * *